Patented Apr. 2, 1929.

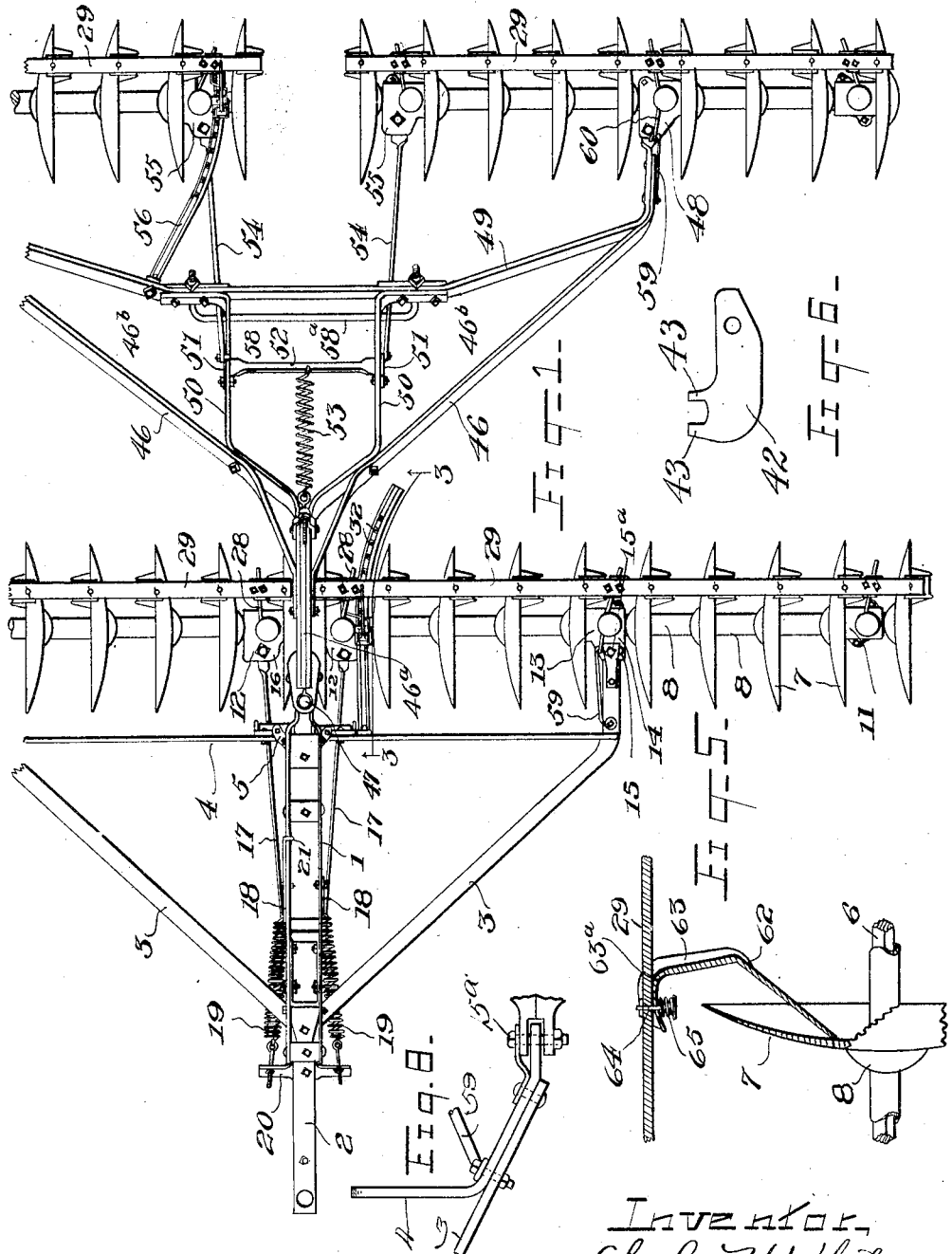

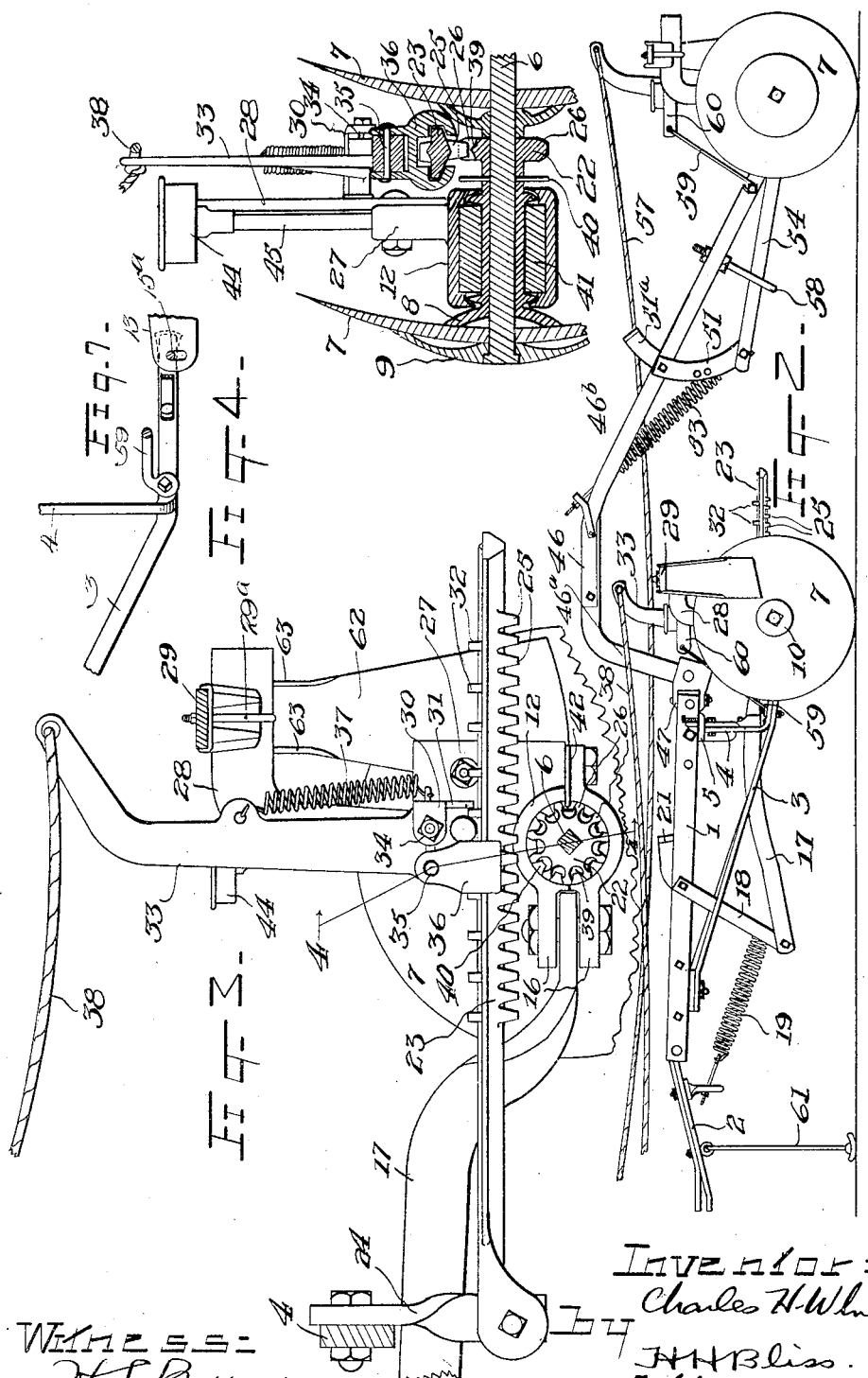

1,707,745

UNITED STATES PATENT OFFICE.

CHARLES H. WHITE, OF MOLINE, ILLINOIS, ASSIGNOR TO DEERE & COMPANY, OF MOLINE, ILLINOIS, A CORPORATION OF ILLINOIS.

DISK-HARROW MECHANISM.

Application filed July 7, 1919. Serial No. 309,009.

This invention relates to improvements in disk harrows, particularly those which have long gangs with numerous disks which engage powerfully with the earth; and resist movements from one angle to another; and especially in disk harrow mechanisms of the "tandem" class each having two or more pairs of such gangs, each pair mounted in a frame, and the two frames connected and drawn together.

The gangs of these harrows require frequent adjustment from one angle to another relatively to each other and to the line of draft and when long, as they are, in the engine drawn tandem harrows, demand considerable power for the adjustment.

One of the objects of the present invention is to provide for varying or adjusting the angles of the disk gangs by means of power derived from the draft devices and have it accomplished in such way that where there is but one operator for an apparatus the changing of the angle of the gangs will not divert his attention from controlling the entire apparatus.

Figure 1 is a plan view, the outermost ends of the gangs at one side being broken away.

Fig. 2 is a side elevation of Fig. 1.

Fig. 3 is a section on the line 3—3, Fig. 1, certain of the parts being shown in elevation.

Fig. 4 is a section on the line 4—4, Fig. 3, certain of the parts being shown in elevation.

Fig. 5 is a detail of one of the disk scrapers.

Fig. 6 is a detail of a guard and scraper device for the gear mounted on the gang axis.

Fig. 7 is a plan and Fig. 8 a side view of the connecting devices which join the bearing of a gang to the draw-bar of the frame.

I have shown the parts which more particularly embody my improvements as combined with a tandem harrow apparatus, that is an apparatus comprising two harrow elements, one behind the other, each having its frame and disk gangs, and the frames being flexibly connected together.

The frame of the front element comprises the central longitudinal horizontal loop-like member 1. To its front end is secured the hitch member 2 for connecting the tractor or engine. The numeral 61 indicates a support member for keeping the framework in a normal horizontal plane when it is disconnected from its tractor or engine. The numerals 3, 3 indicate inclined brace bars secured at their front ends to the frame member 1; the numeral 4 indicates a transverse frame bar; and the numeral 5 indicates a plate fastening together the cross bar 4 and the central frame member 1.

The two front disk gangs are attached to this frame. Each gang comprises a square shaft 6 carrying disks 7 spaced along the shaft by the usual spreaders 8. The numeral 9 indicates a buffer plate or boss engaging with the shaft 6 at its inner end. (See Fig. 4.) At its outer end shaft 6 is threaded to engage with nut 10 by which the disks, spools and shaft are all tightly fastened together.

Each gang has an outer bearing 11, an inner bearing 12 and an intermediate bearing 13. Each side bar 3 of the frame is, at its rear end, turned backward, and is connected to one of the intermediate gang bearings 13. The latter has lips 14 and each lip has a slot 15. The end of the bar 3 fits between the lips and has a coupling pivot pin or bolt 15ᵃ which passes through the slots. These connecting devices permit the gangs, as entireties, to move endwise, inward or outward, in correspondence with the angling adjustments of the gangs; and the buffer plates or bosses 9 are permitted to be in contact and bear against each other, one gang thus resisting the inward thrust of the other.

The bearing boxes of each gang also support the scrapers 62 and their carrying bar 29. Each bearing has a standard or upright 28, secured thereto, bent backward at its upper end. The scraper bar 29 rests upon the upper end parts of the standards and is secured to each of them by a clamping U-bolt 29ᵃ.

The scrapers do not rock but are fixed in position. Each blade 62 is wide and its edge covers enough of the radius of a disk to insure proper cleaning. It is formed of sheet metal and its lower end edge is cut on an inclined line. From the line of contact with the disk face it extends outward (from the concave face of the disk) and upward to provide clearance between it and the disk and to prevent a clogging with trash. At the upper end of the inclined part the shank part is bent to extend almost directly upward as shown in Fig. 5. The edges of this approximately vertical part are folded or bent sharply around lines longitudinal of the shank, as indicated at 62, to provide stiffness.

The shank of the blade at the point where it contacts with the carrier bar 29 is bent around lines transverse of its length, the flanges or folds 63 also being bent transversely, and continuing to the end of the metal. When shaped as thus described there is a horizontally positioned part 63ª of the shank element of the scraper lying below the bar 29, and this part is arched slightly to form a fulcrum around which the disk contacting part can swing away from the disk and yield, if a stick, stone or similar object be carried up and wedged between the disk and the scraper. A pin 64 secures the scraper to the bar 29 (see Fig. 5), the pin projecting some distance below the scraper shank. The numeral 65 indicates a compression spring around the pin 64 and between the bar 29 and the scraper shank. It acts to hold the scraper in engagement with the face of the disk and to return it, after displacement by rocking it, around its fulcrum part at 63ª. The flanges 63 at the sides of the upper part of the scraper shank fit snugly against the sides of the scraper bar 29 and prevent any transverse shifting.

In comparison with other scraper and scraper mountings for disk harrows, the parts here presented constitute an economical, durable and efficient device. The scraper is always in action under spring pressure and each is yieldingly supported independently of all the others.

The upright 28 of the intermediate bearing 13 not only supports the scraper bar 29, but also provides a supporting device for the brace which holds the bearing and the coupling pin of the gang in proper relation. The brace is indicated by 59, it being a rod or bar which is fastened to the rear arm of framebar 3 and extended upward to an arm 60 carried by the upright 28 of said intermediate axle bearing 13. This brace relieves the pivot pin at 15ª and prevents it from being strained by the rocking or torsional movement of the bearing.

The inner bearings 12 are each provided with a pair of lips 16 and between the lips of each pair there is fitted the rear end of a dragbar or link 17, it being held in place by a pivot bolt or pin. The forward ends of the dragbars or links 17 are pivotally connected to arms 18, pivoted in turn, to the frame member 1. As shown, these arms are connected together at their lower ends and move in unison. When they swing backward they allow the bearings 12 and the inner ends of the gangs to move backward; when they are drawn forward they move the gangs forward again to transverse alignment. The arms 18 are thus moved forward by springs 19, each of which has one end adjustably connected to a support 20 fastened to the hitch extension or to the frame and having its other end secured to an arm 18. These springs are adjusted to normally draw the inner ends of the gangs forward to transverse alignment as above stated under all ordinary conditions, and can do so, even when the implement is in motion.

One of the arms 18 (that at the right as shown in Fig. 1) is provided with a stop 21, positioned to engage with the frame member 1, to limit the movement of the arms 18 and prevent the springs from drawing the inner ends of the gangs beyond the line of alignment.

In order to move the inner ends of the gangs in the opposite direction, that is, backward, and thus place the disks of the gangs in one operative position or another, the following devices are provided. These devices are actuated by tractive engagement with the ground and as the disks, in the construction shown, are the only parts contacting with the ground, their engagement with it is utilized for this work of forcing the inner ends of the gangs backward, this movement being in opposition to the springs 19.

On the gang shaft 6, and preferably, between the inner bearing 12 and the second disk 7, there is placed a gear wheel 22. The numeral 23 indicates a rackbar adapted to engage, at option, with the gear. In the mechanism shown the rack 23 abuts against the main frame, it being pivoted to a bracket 24 secured to the framebar 4. The numerals 25, 25 indicate teeth on the rack adapted to engage with the teeth 26 of the gear 22 when the parts are in proper positions. When they are in engagement the forward rotating of the disks on the ground causes the gear to roll backward along the rack, this causing the gang to swing back around the pivot at 15ª. And as the adjacent dragbar 17 is rigidly connected to the dragbar of the other gang, the inner end of the latter will be also forced backward, so that both gangs will be similarly angled in unison. Simultaneously the springs 19 will be put under tension.

The numeral 42 indicates a dirt guard, best seen in Fig. 6. It is a plate clamped between the rear flanges of the halves of the bearing 12, and extends laterally from the bearing to a line beyond the wheel 22. It is slotted or formed with fingers 43, positioned to lie on the sides of the gear teeth 26. These prongs act as scrapers to remove as much as possible of the soil which is carried up by the gear teeth. The bases of the teeth 26 of the gear 22 are so formed that the gear is self-cleaning; that is to say, the metal between the bases of the teeth and at the edges of the central web is chamfered in such way as to leave relatively sharp edges between the teeth in the central radial plane of the wheel, so that any soil that may be carried up between the gear teeth will be forced out when the teeth of the gear and rack are in mesh, the inclines 39 permitting the escape of the soil.

The numeral 40 indicates a washer mounted on the shaft 6 between the gear 22 and the end of the innermost spreader 8 to prevent the access of grit or foreign material to the bearing 12. The numeral 41 indicates the usual wood bushing mounted within the bearing 12. It surrounds and engages with the rotating sleeve part of the spreader. The numeral 44 indicates a grease cup and is connected by a tube 45 with the bearing 12, and furnishes lubricant therefor. Similar grease cups are provided for all of the harrow bearings.

The rack bar is curved horizontally on lines approximately concentric with the gang pivot at 15.

It is lowered and raised as follows: The gang bearing 12 has an upwardly extending bracket 27. The numeral 33 indicates a lever pivoted at 34 to a bracket 30 secured to the bracket 27. The numeral 36 indicates a bifurcated clip pivotally connected at 35 to the lever 33. This slip fits loosely (see Fig. 4) around the side edges of the top flange of the rack bar 23, the rack sliding freely through the clip, but being supported vertically thereby. A spring 37 having one end fixed to the bracket 27 and the other end attached to the lever 33 acts to normally throw the upper end of the lever backward and to draw upward on the clip 36. The lever 33 can, at option, be moved in the opposite direction by a cord 38 extending to the engine platform. When the operator desires to lower the rack to the position of engagement with the gear 22 he exerts a pull on the cord 38 and the upper end of the lever 33 is drawn forward against the tension of spring 37. When he desires to stop the action of the gear in the rack he merely releases the cord 38, whereupon the spring 37 disengages the teeth of the rack from the gear. When the rack is in its uppermost position the springs 19 are prevented from drawing the link bar 17 and the inner ends of the gangs forward, for the rack 23 is provided with a series of stops 32 respectively adapted to engage with a fixed stop 31, on the gang, here shown as attached to the bracket 27 on the bearing box 12.

After the operator releases the cord 38 and the spring 37 pulls the rack up from the gear 22 to its uppermost position one of the teeth 32 instantly engages with and bears against the stop 31 and thus locks together the rack, the bearing 12 and the gang, and so long as the rack abuts against the main frame the bearing 12 and its gang are prevented from moving forward under the tension of spring 19. The stops 32, in number and position, correspond to the several positions of angling adjustment for the gangs.

There is a neutral position for the rack between its uppermost position where its teeth 32 engage with the stop 31 and its lowermost position where its teeth 25 engage with the teeth 26 of the gear, and when the operator desires that the two gangs of the pair should be again brought to transverse alignment he brings the rack to this neutral position. To do this he pulls slightly on the card 38 and draws the lever 33 only a short distance forward, merely far enough, to lower the rack to the line where it is inactive. While it is being held at that line the stop 31, the box 12, (which carries the stop) and the inner end of the gang, are free to move forward, and they commence immediately to so move under the action of the springs 19, the movement continuing until the stop 21 contacts with the framebar 1, which occurs when the two gangs are in tranverse alignment.

The rear element of the apparatus has a frame comprising an arched bar 46$^a$ at the front end which is in the central vertical longitudinal planes of the machine, its upper part being above the disks and gang frames of the front element and its downward extending part 46$^b$ being pivoted at 47 to the front frame. The numerals 46, 46 indicate downward and backward inclined side bars of the rear frame, having their front ends rigidly secured to the central bar element 46$^a$ and their rear ends carried down to the horizontal planes of the rear gang axles. The numerals 50, 50 indicate frame bars rigidly secured to the bars 46 and form part of the central bar 46$^a$, and at their rear ends they are rigidly secured to the forward ends of the bars 49.

Each rear gang comprises parts quite similar to those constituting a front gang including boxes at the outer ends, boxes 55 at the inner ends and intermediate bearing boxes 48. Each box 48 is secured by a pivot to the outer parts of the rear frame. To each inner box 55 there is pivoted a dragbar or link 54. These in turn are pivoted to swinging links or arms 51 and the latter are connected by a crossbar 52 to which is secured a spring 53, adjustably fastened to the upper and central part 46$^a$ of the rear frame. One of the arms 51 has an extension 51$^a$ shaped and positioned to contact with the brace 50 and stop the forward movement of the dragbars 54 and the inner ends of the rear gangs.

The links 54 and the inner ends of the rear axles being all connected together, both of the gangs will be moved simultaneously and in the same direction when either of the dragbars is moved.

At 56 there is a rack pivoted to the frame and having its rear end part extended back over the inner end of one of the gang axles. Immediately below it there is a gear on the axle. The numeral 57 indicates a cord extending to the engine platform and this is adapted to raise and lower the rack 56 in the way above described.

It is not necessary to describe all of the parts in detail which constitute this set of devices, they being substantially similar to the rack 23, the gear 22 and the adjacent adjuncts combined with the gangs of the front element. And the details will be readily understood. In this case, however, the rack bar is curved reversely in comparison with the front rack, the curve being on lines approximately concentric with the pivot which connects the gang axle to the frame. The rear rack and gear move the gangs to their positions of transverse alignment, the spring 53 in this case being the device which moves the inner ends of the gangs to their angled positions. The disks have their concaved sides turned in the opposite direction in comparison with the disks of the front gangs, and therefore the gangs must be inclined to have their inner ends forward when they are in operation.

A support 58 extends downward from the rear frame and has a crossbar 58ª which lies below the dragbars 54 to hold them when the implement is traveling over very uneven ground.

Having thus described, more or less in detail the construction and the action of the several specific parts illustrated, it is to be noted that the essential features of the invention are not dependent upon each and all of the said details. For example, they are not dependent upon the number of disks present; they can be embodied in a structure having a single disk held by a suitable supporting shaft or carrier together with a suitable draft device or frame to which the disk support is movably connected, and with proper intermediate devices which can be optionally controlled. Any one of the disks is both rotary and bodily movable, and the frame and the intermediate devices act to translate the rotary movement of the disk into the movement thereof bodily. If two of the co-related disks be considered it will be seen that each is a rotary ground-engaging traction device which transmits power for causing, or assisting in causing the other to be bodily moved. And, again, it will be seen that use can be made of any of any of numerous modified forms of the devices which are interposed between the rotary ground engaging parts and the draft devices or frame for optionally causing the disks to move bodily in relation to the latter. The frame is to be regarded as the element which holds the disks properly in any of their several positions and through which the draft force is transmitted to the disks for their propulsion.

What I claim is:

1. The combination with the frame and the movable disk carrier, of an optionally acting ground-engaging power device, and means cooperating with said power device and engaging with said carrier to move it.

2. The combination of the frame, the rotary and bodily movable disk, and optionally controlled devices for transmitting power from the disk to the frame to move the disk bodily.

3. The combination of the frame, the rotary and bodily movable disk, and devices actuated by the disk and engaging with the frame for translating the rotary movement of the disk into the bodily movement thereof.

4. The combination with the frame and the horizontally movable disk carrier, of a ground-engaging disk adapted to be rotated by its engagement with the ground, and optionally acting means cooperating with the disk to bear against said carrier to move it.

5. The combination with the frame and the horizontally movable carrier, of an optionally acting ground-engaging disk adapted to be rotated by its engagement with the earth, and means on the frame adapted to cooperate with the disk to cause the latter, when rotating, to move the carrier.

6. The combination of a disk harrow frame, a rotary and angularly movable disk, the power transmitter between the disk and a frame for imparting angular movement to the disk, and means for optionally terminating said movement.

7. The combination of the frame, the movable carrier adapted to support one or more disks, and the rotating ground-engaging traction device adapted to optionally bear against the frame and move the disk carrier.

8. The combination of a disk harrow frame, a rotary and angularly movable disk, power transmitting devices interposed between the disk and the frame for imparting angular movement to the disk, and means for optionally throwing the transmitting devices out of operation.

9. The combination with the frame, and the horizontally movable carrier, of an earth working disk supported on the carrier and adapted to be rotated while engaging with the earth, and means adapted to be optionally moved vertically to and from working position, and cooperating with the disk to move said disk carrier.

10. The combination of a disk harrow frame, a rotary earth working disk, a rotary disk support movable angularly relatively to the frame, and an optionally controlled power transmitter between said disk support and the frame and adapted to move the disk support angularly.

11. The combination of the frame, the rotary disk, the disk support rotated by the disk and movable relatively to the frame, an optionally acting power transmitter between said disk support and the frame and adapted to move the disk bodily.

12. The combination of the frame, the rotary and bodily movable disk, the disk carrier, the abutment on the frame, and means for causing the disk, while rotating, to transmit power to the abutment to move the disk bodily.

13. The combination of the frame, the rotary bodily movable disk, the disk carrier, the abutment on the frame, and a power transmitter adapted to be optionally interposed between the disk carrier and said abutment to cause the movement bodily of the disk.

14. The combination of the frame, the rotary and bodily movable disk, and means acting through optionally variable periods of time for transmitting power from the disk to the frame to cause the movement of the disk bodily.

15. The combination of the frame, the rotary and bodily movable disk, the movable disk carrier, the abutment on the frame, and means acting through optionally variable periods of time adapted to be interposed between the disk carrier and said abutment to move the disk bodily.

16. The combination of the frame, the rotary and bodily movable earth-working disk, the abutment fixed in relation to the movements of the disk, and an optionally controlled power transmitter between the abutment and the disk.

17. The combination with the frame, the horizontally movable shaft, of a series of rotary ground-engaging disks on said shaft, and optionally acting means cooperating with the disks to cause said shaft to move horizontally.

18. The combination of the frame, the disk gang movable as an entirety relatively to the frame and comprising a series of disks and a shaft connected to and rotated by the disks, an optionally controlled power transmitter between the disk carrier and the frame for moving the entire gang.

19. The combination of the draft devices, the two oppositely arranged supports connected to the draft devices and adjustably movable relatively thereto, and each adapted to carry a series of earth-working disks, rotary ground engaging traction devices, and means interposed between the draft devices and said rotary traction devices for moving simultaneously both of the supports relatively to the draft devices.

20. The combination of the draft devices, the oppositely arranged disk gangs connected to the draft devices and movable relatively thereto and each comprising a disk support and a series of disks thereon, means interposed between the disk gangs and the draft devices and actuated by the rotary movement of the disks to move both of the gangs simultaneously relatively to said draft devices.

21. The combination of the draft devices, the oppositely arranged disk gangs connected to the draft devices and movable relatively thereto and each gang comprising a disk support and a series of disks thereon, means actuated by the rotary movement of the disks to move both the gangs simultaneously away from transverse alignment and means interposed between the draft devices and the disk gangs for automatically moving both of the latter toward the position of alignment.

22. The combination of the frame, the rotary and bodily movable disk, optionally controlled devices for transmitting power from the disk to the frame to move the disk bodily in one direction and supplemental means for automatically moving the disk bodily in the opposite direction.

23. The combination of the frame, the oppositely arranged disk gangs movable relatively to the frame toward and from positions in transverse alignment, and each gang comprising a disk support and a series of disks thereon, means actuated by the rotary movement of the disks to move the gangs simultaneously in one direction relatively to the said alignment and supplemental means interposed between the frame and the two disk gangs, for automatically moving the latter simultaneously in the opposite direction.

24. The combination of the frame, the oppositely arranged disk gangs movable relatively to the frame toward and from positions of transverse alignment and each gang comprising a disk support and a series of disks thereon, means actuated by the rotary movement of the disks to move both of the gangs simultaneously in one direction relative to said alignment and springs interposed between the draft frame and the gangs for automatically moving the latter in the opposite direction.

25. The combination of the frame, the rotary and bodily movable disk, the gear wheel driven by the disk and a rack carried by the frame adapted to be optionally engaged with said wheel.

26. The combination of the frame, the rotary and bodily movable disk, optionally controlled devices for transmitting power from the disk to move it bodily in one direction and the optionally acting stops for holding the disk from moving bodily.

27. The combination of the frame, the rotary and bodily movable disk, the gear wheel driven by the disk, the bar carried by the frame and adapted to be optionally engaged with said wheel to move the disk in one direction and to act as a stop to prevent the disk from moving it bodily in the other direction.

28. A gang shifting mechanism for disk harrows comprising a ground engaging member and means operated by said member to shift the gang by power derived from the travel of the harrow.

29. A gang shifting mechanism for disk harrows comprising a pivotally mounted ground engaging member, means to be operated by said member to shift the gang by power derived from the travel of the harrow, including power-transmitting members 30. In a disk harrow, a main frame, shiftable disks and rotatable means operative by the movement of the harrow to change the angle of the disks relative to the line of draft.

31. In a disk harrow, a main frame, shiftable disks and means operative by the forward movement of the harrow to shift the disks from transport to working postion and from working position to transport position.

32. A disk harrow having a plurality of gangs of shiftable disks and connections between them to transmit to one gang power applied to shift the other, in combination with means for applying to the latter gang power derived from the travel of the harrow, and a traction member having connection with said means.

33. In a harrow, the combination of a plurality of sets of pivoted harrow sections, one set being arranged in rear of the other, means for setting said harrow sections and automatic means for moving said sections in unison with each other.

34. In a harrow, the combination with harrow sections, of mechanism adapted to be put into operation from a point remote from the harrow and caused to be operated by rotative movement of disks of one of the said sections for angling the sections with respect to the line of draft.

35. In a harrow, the combination of harrow sections adapted to be angled with respect to the line of draft, and means for angling the sections by power derived from traction from certain of the harrow elements.

36. A gang shifting mechanism for disk harrows comprising a ground engaging member, means to be operated by said member to shift the gang by power derived from the travel of the harrow, said member being normally inoperative with relation to said means, and means to render it operative, at will.

37. A gang shifting mechanism for disk harrows including a pivotally mounted ground engaging member, means to be operated by said member to shift the gang by power derived from the travel of the harrow, said member being normally inoperative with relation to said means, and means to render it operative at will.

38. In a disk harrow, a main frame, shiftable disks and means, including a ground engaging member and connections operative by said ground engaging member, to change the angle of the disks with relation to the line of draft by power derived from the movement of the harrow.

39. In a disk harrow, a main frame, shiftable disks and means, including a ground engaging member and connections operative by said member, to shift the disks from transport postion to working position and from working position back to transport position by power derived from the forward travel of the harrow.

40. In a disk harrow, a main frame, shiftable disks and controllable means operative to vary the angle of the disks with relation to the line of draft, including a ground engaging member and co-operating connections normally inoperative to change the angle of the disks, and also including means operable at will to make said ground engaging member operative through said connections to cause the angle of the disks with relation to the line of draft to be changed by power derived from the forward travel of the harrow.

41. In a disk harrow, a main frame, shiftable disks and controllable means operable to vary the angle of the disks with relation to the line of draft, including a ground engaging member and co-operating connections normally inoperative to change the angle of the disks and also including means operable at will to make said ground engaging member operative through said connections to shift the disks from transport position to working position and from working position back to transport by movement of the ground engaging member derived from forward travel of the harrow.

42. A tandem disk harrow having a front pair of gangs, a rear pair of gangs, connections between the pairs of gangs, and means for angling the gangs operated by power derived from movement of one or more sets of the gangs.

43. A tandem disk harrow comprising a front pair of gangs, a rear pair of gangs, connections between the pairs of gangs, and means for utilizing the power of the rotating disks to angle the gangs.

44. A tandem disk harrow comprising a front pair of gangs, a rear pair of gangs, connections between the gangs, means for utilizing the rotating power of the disks to angle the gangs, and means for controlling said power operated angling mechanism arranged to be set into operation by movement of a control member.

45. A disk harrow having a draft frame, a pair of gangs, and means for angling the gangs operated by power derived from one of the gangs.

46. A disk harrow having a draft frame, a pair of disk gangs mounted so they may be moved to different angular positions, and means for angling the gangs operated by power derived from the rotation of one or more of the disks.

47. A disk harrow having a draft device, a pair of gangs, and means operated by power from one of the gangs for angling the gangs, said means including mechanism by means of which the angle to which the gangs are moved for working can be varied to suit the requirements but in every case the gangs will be returned to their initial or transport position when the angling mechanism is operated for that purpose.

48. The combination with a disk harrow comprising a frame and disk gangs pivoted thereto, of traction actuated angling mechanism for the gangs comprising a rotating element mounted on the frame and driven by travel of the harrow, a member slidable back and forth on the frame, connections between one end of the gangs and said member, and means for reciprocating said member through the action of said rotating element.

49. In a harrow, the combination of rotary harrow sections, and mechanism operated by rotative movement of one of said sections for angling it with respect to the line of draft.

50. In a harrow, the combination of a draft structure, harrow sections each having rotary earth working elements, and means operating between the draft structure and said harrow sections and operated by rotative movement of certain of said elements for moving the sections with respect to the line of draft.

51. In a harrow, the combination with rotary harrow sections adapted to be angled with respect to the line of draft, of mechanism operated by rotation of the harrow elements for angling the sections.

52. A disk harrow having a gang of shiftable disks and mechanism for shifting said gang, the shifting mechanism including a rotatable ground engaging member and means operated by said ground engaging member to shift the gang by power derived from the travel of the harrow.

53. A disk harrow having a gang of shiftable disks and mechanism for shifting said gang, a shifting mechanism including a rotatable ground engaging member, means to be operated by said ground engaging member to shift the gang by power derived from the travel of the harrow, and means operable at will to make said ground engaging member operable upon the first-mentioned means.

54. A disk harrow having a plurality of gangs of shiftable disks and connections between them to shift one gang by power applied to the other, in combination with means to apply said power by motion derived from a ground engaging member of the harrow.

In testimony whereof, I affix my signature.

CHARLES H. WHITE.